United States Patent [19]

Winful

[11] Patent Number: 4,687,286

[45] Date of Patent: Aug. 18, 1987

[54] METHODS OF AND APPARATUS FOR OPTICAL SPATIAL SCANNING

[75] Inventor: Herbert G. Winful, Bedford, Mass.

[73] Assignee: GTE Laboratories Incorporated, Waltham, Mass.

[21] Appl. No.: 730,215

[22] Filed: May 3, 1985

[51] Int. Cl.[4] .............................................. G02B 6/34
[52] U.S. Cl. .............................. 350/96.19; 350/96.15
[58] Field of Search ............... 350/96.15, 96.16, 96.18, 350/96.19, 96.30, 162.20, 162.24

[56] References Cited

U.S. PATENT DOCUMENTS

| | | | |
|---|---|---|---|
| 3,814,498 | 6/1974 | Tomlinson et al. | 350/96.19 |
| 4,096,446 | 6/1978 | Haus et al. | 350/96.19 |
| 4,262,996 | 4/1981 | Yao | 350/96.19 |
| 4,286,838 | 9/1981 | Huignard et al. | 350/96.19 |

OTHER PUBLICATIONS

Katzir et al; "Chirped-Grating Output Couplers in Dielectric Waveguides"; *Appl. Phys. Letters;* vol. 30, No. 5, Mar. 1977; pp. 225, 226.

Yao et al; "Chirp-Grating Lens for Guided Wave Optics"; *Appl. Physics Letters;* vol. 33; pp. 635–637; 1978.

Katzir et al; "Chirped Gratings in Integrated Optics"; *IEEE J. of Quantum Electronics;* vol. QE-13, No. 4; pp. 296–304; 1977.

*Primary Examiner*—Robert E. Wise
*Attorney, Agent, or Firm*—Fred Fisher

[57] ABSTRACT

A chirped grating focuses guided waves to variable space points as determined by the intensity of a control beam. This can be achieved with a light controlled spatial scanner which includes a corrugated waveguide fabricated of a material having a non-linear index coefficient of refraction $n_2$. The waveguide has corrugations with a period that varies linearly from $\Lambda(O)$ at one point to $\Lambda(L)$ at another point, where $\Lambda(O)$ is greater than $\Lambda(L)$. Guided modes of light are applied within the waveguide in a direction from the one point to the other point wherein the corrugations couple light from the guided modes to radiation modes focused at a focal spot in space. The intensity of the light within the waveguide is varied to cause the focal spot to traverse a path without the waveguide, dependent upon the varied intensity.

10 Claims, 3 Drawing Figures

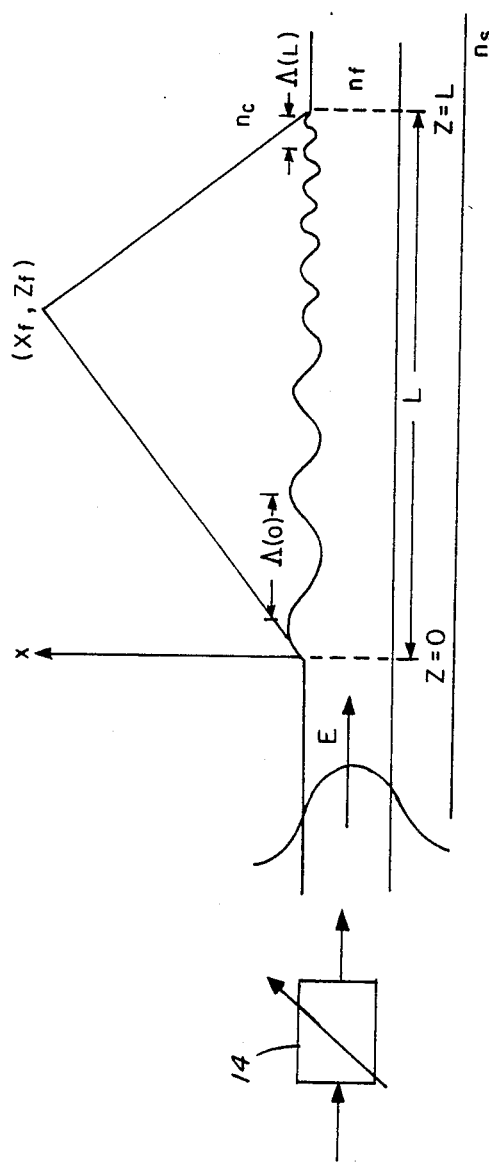
FIG. IA
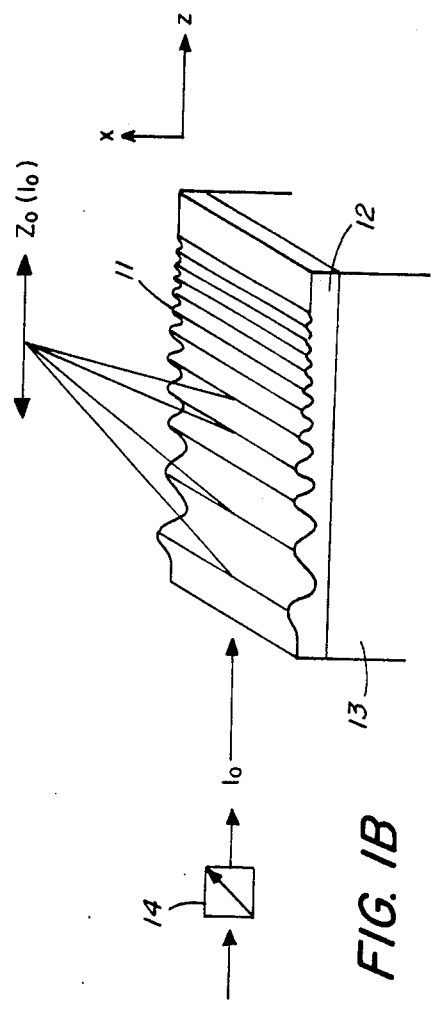
FIG. IB

METHODS OF AND APPARATUS FOR OPTICAL SPATIAL SCANNING

BACKGROUND OF THE INVENTION

1. Field of the Invention

This invention relates to methods of and apparatus for light controlled spatial scanning. Accordingly, it is a general object of this invention to provide new and improved methods and apparatus of such character.

2. General Background

It is desirable to provide devices that permit an optical beam to be rapidly scanned from point to point. Such devices could provide an important role in the variable optical interconnect systems for integrated circuits. The use of chirped gratings as focusing elements is well known in the art of integrated optics, as discussed, for example, in "Chirp Grating Lens for Guided Wave Optics" by S. K. Yao and D. E. Thompson, Applied Phys. Letters 33, pp. 635–637 (1978).

Chirped gratings, that is, gratings whose periodicity varies with distance along the grating, have been used in integrated optics to couple guided modes into radiation modes focused at a point or line in space, as discussed by A. Katzir et al., IEEE Journal Quantum Electronics QE-13, pp. 296–304 (1977).

SUMMARY OF THE INVENTION

Another object of this invention is provide a new and improved light controlled spatial scanner in which a focal spot of light is controlled by varying the intensity of light applied to a waveguide.

Still another object of this invention is to provide a new and improved method of controlling a spatially scanned beam of light by varying the intensity of the light within such waveguide.

In accordance with one aspect of the invention, a light controlled spatial scanner includes a corrugated waveguide fabricated of a material having a nonlinear index coefficient of refraction $n_2$. The waveguide has corrugations with a period that varies linearly from $\Lambda$ (0) at one point to $\Lambda$ (L) at another point, where $\Lambda$ (0) is greater than $\Lambda$ (L). Means are provided for applying guided modes of light within the waveguide in a direction from the one point to the other point wherein the corrugations couple light from the guided modes to radiation modes focused at a focal spot in space. Means are further provided for varying the intensity of the light within the waveguide to cause the focal spot to traverse a path without the waveguide, dependent upon the varied intensity. In accordance with certain features of the invention, the waveguide can be formed of a thin film of material having an index coefficient of refraction $n_f$, deposited upon a substrate material having an index coefficient of refraction $n_s$, and including a capping layer having an index coefficient of refraction $n_c$, wherein $n_s > n_f > n_c$. The capping layer can be air.

In accordance with another aspect of the invention, a light controlled spatial scanner can include a corrugated waveguide fabricated of a material having a nonlinear index coefficient of refraction $n_2$. The waveguide has corrugations with a period that varies linearly from $\Lambda$ (0) at one point to $\Lambda$ (L) at another point, where $\Lambda$ (0) is greater than $\Lambda$ (L). Means are provided for applying guided modes of light within the waveguide in a direction from the one point to the other point, wherein the corrugations couple light from the guided modes to radiation modes focused at a focal spot in space. Means are provided for varying the index coefficient of refraction to cause the focal spot to traverse a path without the waveguide, dependent upon the varied index coefficient. In accordance with certain features of the invention, the means for varying the index coefficient of refraction of the waveguide can include a control beam applied to the waveguide for altering the index of refraction. The means for varying the index coefficient of refraction of the waveguide can include a signal beam of varying intensity for varying the index of refraction.

In accordance with another aspect of the invention, a method of controlling a spatially scanned beam of light can include the steps of providing a corrugated waveguide fabricated of a material having a nonlinear index coefficient of refraction $n_2$. The waveguide can have corrugations with a period that varies linearly from $\Lambda$ (0) at one point to $\Lambda$ (L) at another point, where. $\Lambda$ (0) is greater than $\Lambda$ (L). Guided modes of light can be applied within the waveguide in a direction from the one point to the other point, wherein the corrugations couple light from the guided modes to radiation modes focused at a focal spot in space. The intensity of the light is varied within the waveguide to cause the focal spot to traverse a path without the waveguide, dependent upon the varied intensity. In accordance with certain features of the invention, the waveguide is formed of a thin film of material having an index coefficient of refraction $n_f$ deposited upon a substrate material having an index coefficient of refraction $n_s$, and including a capping layer having an index coefficient of refraction $n_c$, wherein $n_s > n_f > n_c$.

In accordance with yet another aspect of the invention, a method of controlling a spatially scanned beam of light includes the steps of providing a corrugated waveguide fabricated of a material having a nonlinear index coefficient of refraction $n_2$. The waveguide has corrugations with a period that varies linearly from $\Lambda$ (0) at one point to $\Lambda$ (L) at another point, where $\Lambda$ (0) is greater than $\Lambda$ (L). Guided modes of light are applied within the waveguide in a direction from the one point to the the other point, wherein corrugations couple light from the guided modes to radiation modes focused at a focal spot in space. The index coefficient of refraction is varied to cause the focal spot to traverse a path without the waveguide, dependent upon the varied index coefficient. In accordance with certain features of the invention, the index coefficient of refraction of the waveguide is varied by applying a control beam to the waveguide for altering the index of refraction. In accordance with another feature, the index coefficient of refraction of the waveguide is varied by varying intensity of a signal beam applied thereto.

BRIEF DESCRIPTION OF THE DRAWINGS

Other objects, advantages, and features of this invention, together with its construction and mode of operation, will become more apparent from the following description, when read in conjunction with the accompanying drawings, in which:

FIG. 1a is a diagrammatic view of one embodiment of the invention;

FIG. 1b is a perspective view of the embodiment depicted in FIG. 1a; and

DESCRIPTION OF PREFERRED EMBODIMENTS

Figure 2:
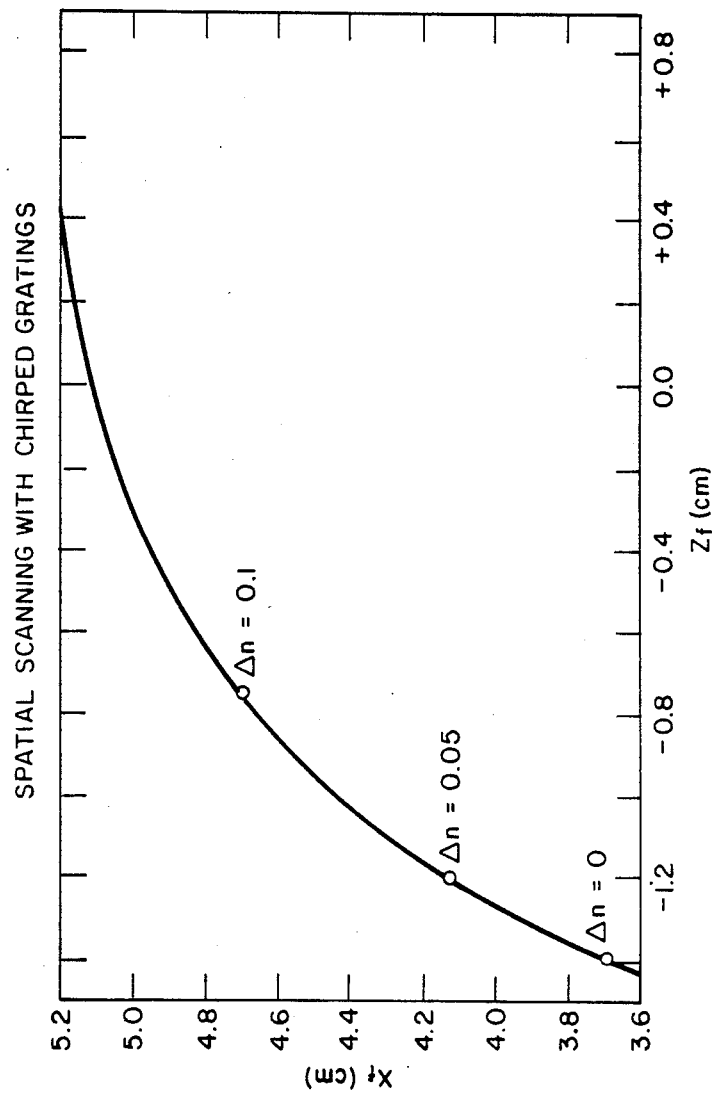
FIG. 2 is chart of spatial scanning with chirp gratings illustrating how the path can vary with changes in indices of refraction.

As indicated above, gratings whose periods vary in some specified matter, have been used to couple guided modes into radiation modes focused at a point in space. The principle of operation is indicated in FIG. 1b. Such gratings can be routinely fabricated by forming a hologram using a focused beam and a plane reference wave. The point in space at which the radiation is focused depends on the wavelength of the guided mode. Thus, by changing the wavelength of the guided mode, the focal spot of radiation can be varied. In addition, by changing the refractive index of the guiding layer, the focal spot of the radiation can be varied. For a change of index of 5%, the focused spot can be moved by 1 cm. One can use a control beam to change the focal point of a weak signal beam. Alternatively, by varying the intensity of the signal beam alone, one can cause it to self-scan.

Referring to the drawing, a preferred embodiment of the invention includes a corrugated waveguide 11 fabricated in a thin film 12 having a large nonlinear index coefficient $n_2$. The film 12 can be supported on a suitable substrate 13 having an index coefficient of refraction $n_S$. The period of the corrugations 11 varies linearly from $\Lambda (0)$, as indicated best in FIG. 1a, to $\Lambda (L)$, where $\Lambda (0)$ is greater than $\Lambda (L)$ (See FIG. 1a).

The corrugated waveguide 12 couples light from guided modes, provided by a suitable source 14, to radiation modes focused at a point in space. The location of the focal point $(x_f, z_f)$ depends on the wavelength of the guided mode, the guide index, and the grating chirp. The refractive index of the guiding region can be altered by varying the light intensity within the guide. This can be achieved by varying the light intensity at the means 14 which is provided to the film 12 along the path. This causes the focal spot to move to different points depending upon the intensity of the light.

Two geometries are suggested. In one case, a strong control beam can alter the refractive index seen by a weaker signal beam. In another, the signal beam, in itself, is strong enough to change the refractive index and cause a self-scanning of the signal beam.

The focusing properties of the chirped grating is shown in FIG. 2. The curve shows the locus of focal points traced out as the control beam intensity, or equivalently, the refractive index, is varied.

Various modifications can be made without departing from the spirit and scope of this invention. For example, when an electro-optic material is used to form the waveguide layer, scanning can be achieved by applying dc electric fields across such material.

What is claimed is:

1. A light controlled spatial scanner comprising
  a corrugated waveguide fabricated of a material having a nonlinear index coefficient of refraction $n_2$, said waveguide having corrugations with a period that varies linearly from $\Lambda (0)$ at one point to $\Lambda (L)$ at another point, where $\Lambda (0)$ is greater than $\Lambda (L)$;
  means for applying guided modes of light within said waveguide in a direction from said one point to said another point, wherein said corrugations couple light from said guided modes to radiation modes focused at a focal spot in space; and
  means for varying intensity of said light within said waveguide to cause said focal spot to traverse a path without said waveguide dependent upon the varied intensity.

2. The scanner as recited in claim 1 wherein said waveguide is formed of a thin film of material having an index coefficient of refraction $n_f$, deposited upon a substrate material having an index coefficient of refraction $n_S$, and including a capping layer having an index coefficient of refraction $n_c$, wherein $n_S > n_f > n_c$.

3. A light controlled spatial scanner comprising
  a corrugated waveguide fabricated of a material having a nonlinear index coefficient of refraction $n_2$, said waveguide having corrugations with a period that varies linearly from $\Lambda (0)$ at one point to $\Lambda (L)$ at another point, where $\Lambda (0)$ is greater than $\Lambda (L)$;
  means for applying guided modes of light within said waveguide in a direction from said one point to said another point, wherein said corrugations couple light from said guided modes to radiation modes focused at a focal spot in space; and
  means for varying said index coefficient of refraction to cause said focal spot to traverse a path without said waveguide dependent upon the varied index coefficient.

4. The scanner as recited in claim 3 wherein said means for varying said index coefficient of refraction of said waveguide comprises
  a control beam applied to said waveguide for altering said index of refraction.

5. The scanner as recited in claim 3 wherein said means for varying said index coefficient of refraction of said waveguide comprises
  a signal beam of varying intensity for varying said index of refraction.

6. A method of controlling a spatially scanned beam of light comprising the steps of
  providing a corrugated waveguide fabricated of a material having a nonlinear index coefficient of refraction $n_2$, said waveguide having corrugations with a period that varies linearly from $\Lambda (0)$ at one point to $\Lambda (L)$ at another point, where $\Lambda (0)$ is greater than $\Lambda (L)$;
  applying guided modes of light within said waveguide in a direction from said one point to said another point, wherein said corrugations couple light from said guided modes to radiation modes focused at a focal spot in space; and
  varying intensity of said light within said waveguide to cause said focal spot to traverse a path without said waveguide dependent upon the varied intensity.

7. The method as recited in claim 6 wherein said waveguide is formed of a thin film of material having an index coefficient of refraction $n_f$, deposited upon a substrate material having an index coefficient of refraction $n_S$, and including a capping layer having an index coefficient of refraction $n_c$, wherein $n_S > n_f > n_c$.

8. The method as recited in claim 7 wherein said index coefficient of refraction of said waveguide is varied by
  applying a control beam to said waveguide for altering said index of refraction.

9. The method as recited in claim 7 wherein said index coefficient of refraction of said waveguide is varied by varying intensity of a signal beam applied thereto.

10. A method of controlling a spatially scanned beam of light comprising the steps of providing a corrugated waveguide fabricated of a material having a nonlinear index coefficient of refraction $n_2$, said waveguide having corrugations with a period that varies linearly from $\Lambda(0)$ at one point to $\Lambda(L)$ at another point, where $\Lambda(0)$ is greater than $\Lambda(L)$;

applying guided modes of light within said waveguide in a direction from said one point to said another point, wherein said corrugations couple light from said guided modes to radiation modes focused at a focal spot in space; and varying said index coefficient of refraction to cause said focal spot to traverse a path without said waveguide dependent upon the varied index coefficient.

* * * * *